United States Patent
Xu et al.

(10) Patent No.: US 12,030,430 B2
(45) Date of Patent: Jul. 9, 2024

(54) STEERING WHEEL

(71) Applicant: Autoliv Development AB, Vargarda (SE)

(72) Inventors: Linlin Xu, Shanghai (CN); Liang Ding, Shanghai (CN); Xiaoshan Lu, Shanghai (CN)

(73) Assignee: Autoliv Development AB, Våargårda (SE)

( * ) Notice: Subject to any disclaimer, the term of this patent is extended or adjusted under 35 U.S.C. 154(b) by 0 days.

(21) Appl. No.: 18/552,368

(22) PCT Filed: Jan. 12, 2022

(86) PCT No.: PCT/CN2022/071546
§ 371 (c)(1),
(2) Date: Sep. 25, 2023

(87) PCT Pub. No.: WO2022/206110
PCT Pub. Date: Oct. 6, 2022

(65) Prior Publication Data
US 2024/0166126 A1  May 23, 2024

(30) Foreign Application Priority Data
Mar. 31, 2021 (CN) .......... 202110352053.X

(51) Int. Cl.
*B60Q 3/283* (2017.01)
*B60Q 3/64* (2017.01)
(Continued)

(52) U.S. Cl.
CPC ............ *B60Q 3/283* (2017.02); *B60Q 3/64* (2017.02); *B62D 1/06* (2013.01); *G02B 6/001* (2013.01)

(58) Field of Classification Search
CPC .......... B60Q 3/283; B60Q 3/64; G02B 6/001
See application file for complete search history.

(56) References Cited

U.S. PATENT DOCUMENTS 11,198,387 B1 * 12/2021 Matsu ............... F21V 23/005
2016/0311366 A1 * 10/2016 Lisseman ............ G02B 6/0093

FOREIGN PATENT DOCUMENTS

CN 201980283 U 9/2011
CN 103764482 A 4/2014
(Continued)

*Primary Examiner* — Fatima N Farokhrooz
(74) *Attorney, Agent, or Firm* — Matthew D. Thayne; Thayne and Davis LLC

(57) ABSTRACT

A steering wheel. The steering wheel includes a steering wheel rim and a light-emitting assembly, the steering wheel rim having an inner cavity, and the light-emitting assembly being provided in the inner cavity so as to be used to cause the steering wheel rim to emit light, wherein the light-emitting assembly includes a light source, a first printed circuit board, and a second printed circuit board, wherein the light source is provided on the first printed circuit board, the second printed circuit board being provided with a control assembly for controlling the light source, the second printed circuit board being configured to control the light source by means of an electrical connection with the first printed circuit board, the first printed circuit board being configured to be a flexible circuit board, and the second printed circuit board being configured to be a rigid circuit board.

9 Claims, 4 Drawing Sheets

(51) Int. Cl.
*B62D 1/06* (2006.01)
*F21V 8/00* (2006.01)

(56) References Cited

FOREIGN PATENT DOCUMENTS

| | | |
|---|---|---|
| CN | 104334407 A | 2/2015 |
| CN | 106536280 A | 3/2017 |
| DE | 102018200591 A1 | 7/2019 |

* cited by examiner

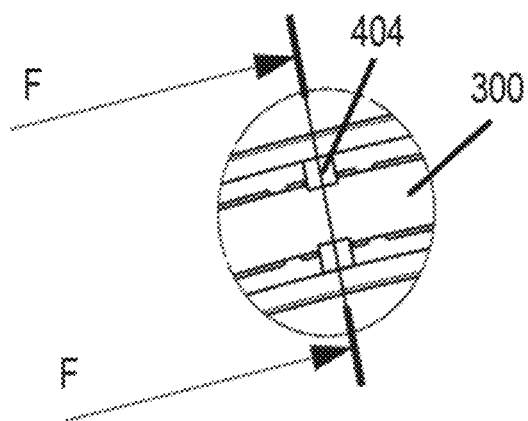
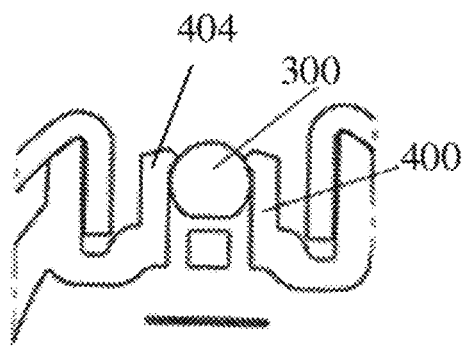
FIG. 5(a)   FIG. 5(b)
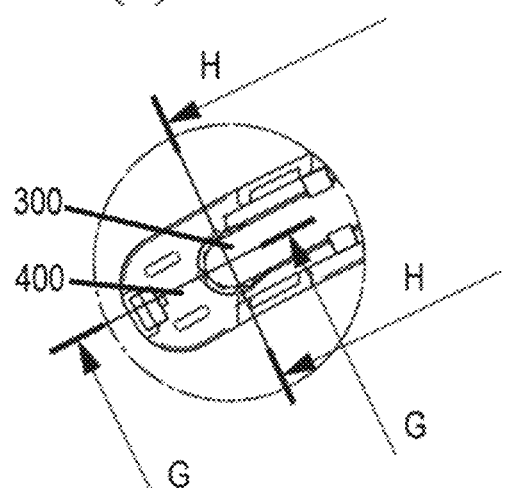
FIG. 6(a)
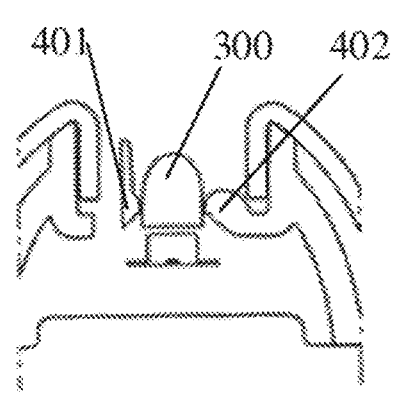
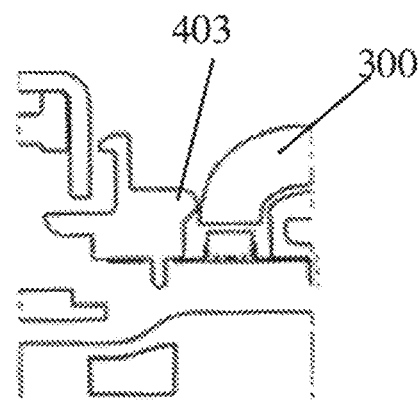
FIG. 6(b)   FIG. 6(c)

STEERING WHEEL

TECHNICAL FIELD

The present invention relates to automobile parts, in particular to a steering wheel.

BACKGROUND

Steering wheels of some automobiles can emit light. Steering wheel rims of these steering wheels are illuminated when light-emitting members emit light, so that light is emitted at the wheel rims of the steering wheels. The steering wheel is provided with the light-emitting steering wheel rim, so that in one aspect, a decorative effect is achieved, and the steering wheel is more aesthetically pleasing. In another aspect, in the case that lighting is poor (e.g., at night), the light-emitting steering wheel rim can provide an illumination function. However, because the steering wheel rim is provided with a light-emitting assembly for emitting light, the steering wheel becomes bulky and heavy. Correspondingly, this results in higher requirements on the mechanical strength of the frame of the steering wheel, thereby increasing design difficulty of the steering wheel.

SUMMARY

The objective of the present invention is to provide a relatively small and lightweight steering wheel. Further, the objective of the present invention is also to provide a steering wheel of which a light-emitting assembly does not result in an increase in design difficulty.

Provided in the present invention is a steering wheel, comprising a steering wheel rim and a light-emitting assembly, the steering wheel rim having an inner cavity, and the light-emitting assembly being provided in the inner cavity so as to be used to cause the steering wheel rim to emit light, wherein, the light-emitting assembly comprises a light source, a first printed circuit board, and a second printed circuit board, wherein the light source is provided on the first printed circuit board, the second printed circuit board being provided with a control assembly for controlling the light source, the second printed circuit board being configured to control the light source by means of an electrical connection with the first printed circuit board, the first printed circuit board being configured to be a flexible circuit board, and the second printed circuit board being configured to be a rigid circuit board.

According to an embodiment of the present invention, the light-emitting assembly further comprises a light guide member, and the steering wheel rim comprises a housing, the light guide member being provided on a first side surface of the housing, and the first printed circuit board and the second printed circuit board being provided on a second side surface of the housing opposite the first side surface.

According to an embodiment of the present invention, the housing is provided with a recess for accommodating the light guide member, and the recess is provided with a protruding portion for securing the light guide member.

According to an embodiment of the present invention, the light guide member is configured to be a light guide tube, and the protruding portion comprises a first protruding portion, a second protruding portion, a third protruding portion, and a fourth protruding portion, the first protruding portion, the second protruding portion, and the third protruding portion being provided at each hook-shaped end portion of the light guide member, the first protruding portion and the second protruding portion at each hook-shaped end portion being opposite each other in a radial direction of the steering wheel rim and abutting the light guide member, the third protruding portion abutting an end side of the light guide member so as to prevent the light guide member from rotating relative to the housing, and the fourth protruding portion being configured to abut an upper side of the light guide member so as to hold the light guide member to the housing.

According to an embodiment of the present invention, one of the light guide member and the recess is provided with a position-limiting protruding portion, and the other is provided with a position-limiting recess, the position-limiting protruding portion and the position-limiting recess cooperating to limit the position of the light guide member relative to the housing.

According to an embodiment of the present invention, another side of the first printed circuit board opposite a side where the light source is located is provided with a reinforcement portion, and at least a portion of the reinforcement portion corresponds to the light source in a thickness direction of the first printed circuit board.

According to an embodiment of the present invention, the first printed circuit board is secured to the housing by means of a securing member and at the reinforcement portion.

According to an embodiment of the present invention, the housing is provided with a slide slot, and the second printed circuit board is configured to slide in the slide slot relative to the housing so as to be secured to the housing.

According to an embodiment of the present invention, one end of the first printed circuit board is inserted into an interface provided on the second printed circuit board so as to achieve the electrical connection between the first printed circuit board and the second printed circuit board.

According to an embodiment of the present invention, the steering wheel rim further comprises a cap secured on the housing, and light emitted by the light source passes through a hole of the housing and the light guide member, and is then emitted from the cap so as to cause the steering wheel rim to emit light.

BRIEF DESCRIPTION OF THE DRAWINGS

The features, advantages, and technical effects of exemplary embodiments of the present invention will be described below with reference to the accompanying drawings. In the accompanying drawings, the same reference numbers denote the same elements, where FIG. 1 schematically illustrates a steering wheel according to an embodiment of the present invention.

FIG. 5(a) is an enlarged view of a portion B in FIG. 3, and FIG. 5(b) is a cross-sectional view acquired along a line F-F in FIG. 5(a).

FIG. 6(a) is an enlarged view of a portion C in FIG. 3, and FIG. 6(b) and FIG. 6(c) are cross-sectional views acquired along lines H-H and G-G in FIG. 4(a), respectively.

DETAILED DESCRIPTION

Figure 1:
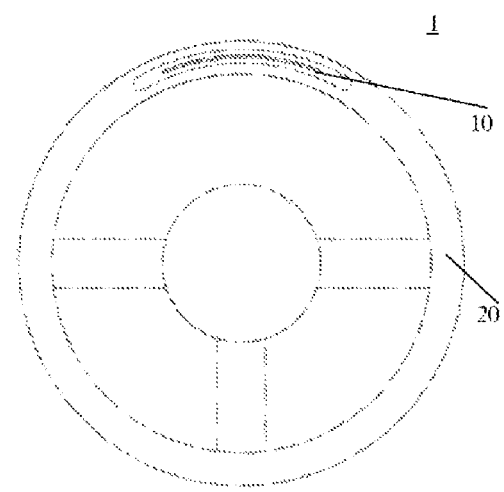

Specific implementations of a steering wheel according to the present invention will be described below with reference to the accompanying drawings. The following detailed description and the accompanying drawings are used to illustratively explain the principles of the present invention. The present invention is not limited to the described preferred embodiments, and various embodiments described in the present invention can be used individually or in any combination. The protection scope of the present invention is defined by claims.

In addition, terms for spatial relations (such as "upper", "lower", "left", "right", etc.) are used to describe a relative positional relationship between an element and another element shown in the accompanying drawings.

Therefore, when used, the terms for spatial relations may be applied to directions different from those shown in the accompanying drawings. Obviously, although all of these terms for spatial relations refer to the directions shown in the accompanying drawings for ease of explanation, a person skilled in the art will appreciate that directions different from those shown in the drawings may be used.

FIG. 1 schematically illustrates a steering wheel according to an embodiment of the present invention. The steering wheel according to the embodiment of the present invention is described below with reference to FIG. 1.

As shown in FIG. 1, provided in the present invention is a steering wheel 1. The steering wheel 1 includes a steering wheel rim 20 and a light-emitting assembly 10, and the light-emitting assembly 10 is provided at the steering wheel rim 20. Specifically, the steering wheel rim 20 has an inner cavity, and the light-emitting assembly 10 is provided in the inner cavity of the steering wheel rim 20 so as to be used to cause the steering wheel rim 20 to emit light. As an example, the light-emitting assembly 10 is provided in the inner cavity of the steering wheel rim 20, and the entire outer surface of the steering wheel rim 20 is smooth. Especially, a portion of the steering wheel rim 20 where the light-emitting assembly 10 is provided is flush with the remaining portion of the steering wheel rim 20, so that the steering wheel rim 20 has a consistent and complete appearance. In addition, it should be noted that although it can be clearly seen from FIG. 1 that the light-emitting assembly 10 of this embodiment is configured to be in the shape of a circular arc, and correspondingly, the light-emitting assembly 10 has a circular arc capable of emitting light, the steering wheel of the present invention is not limited thereto, and the light-emitting assembly may also be configured to be in other shapes, such as semi-circular, circular, and even other irregular shapes.

Figure 2:
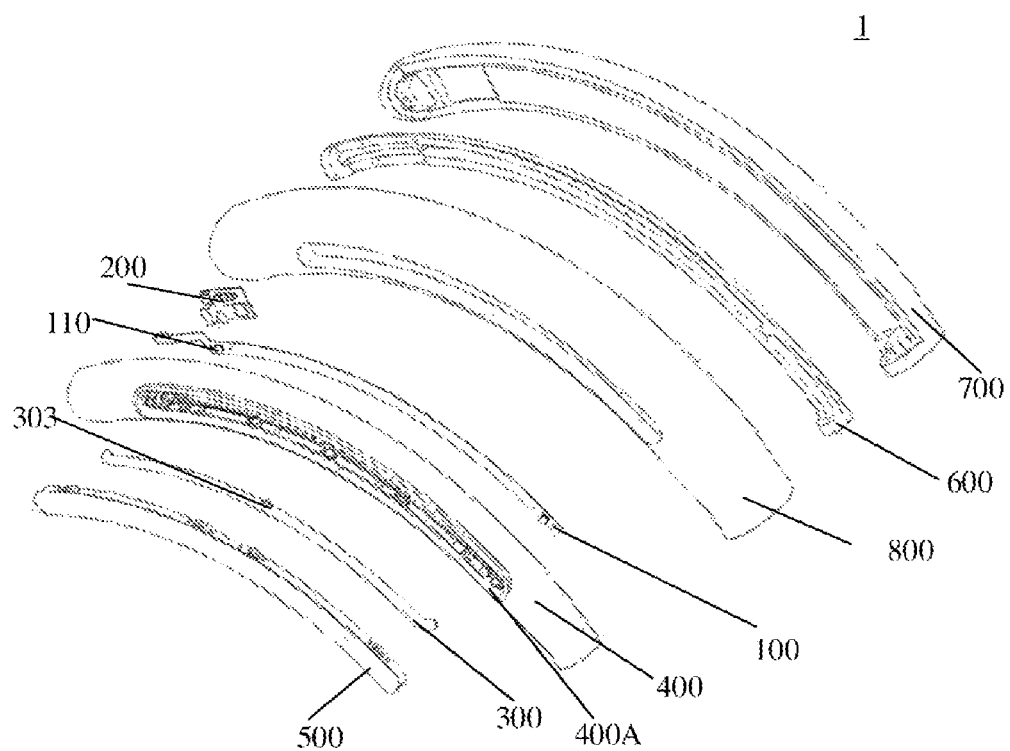
FIG. 2 schematically illustrates a light-emitting assembly in a steering wheel according to an embodiment of the present invention.

FIG. 2 schematically illustrates a light-emitting assembly in a steering wheel according to an embodiment of the present invention. The light-emitting assembly in the steering wheel according to the embodiment of the present invention is described below with reference to FIG. 2.

As shown in FIG. 2, the steering wheel 1 according to the embodiment of the present invention is illustrated by means of an exploded view so as to more clearly illustrate the structure of the steering wheel 1. As shown in FIG. 2, in the steering wheel 1 according to the embodiment of the present invention, the light-emitting assembly 10 includes a light source 110, a first printed circuit board 100, and a second printed circuit board 200. The foregoing components of the light-emitting assembly 10 are described in detail below.

As shown in FIG. 2, the light source 110 is provided on the first printed circuit board 100. In this embodiment, left and right ends of the first printed circuit board 100 are each provided with one light source 110 (e.g., an LED). The second printed circuit board 200 is provided with a control assembly for controlling the light source 110, so as to, for example, control actions such as turning on and turning off the light source 110. To this end, one end of the first printed circuit board 100 (an end portion of the first printed circuit board 100 located on a left side of the left light source 110 in FIG. 2) is inserted into an interface provided on the second printed circuit board 200 so as to achieve an electrical connection between the first printed circuit board 100 and the second printed circuit board 200, whereby the second printed circuit board 200 is configured to control the light source 110 by means of the electrical connection with the first printed circuit board 100. In addition, the first printed circuit board 100 is configured to be a flexible circuit board, and the second printed circuit board 200 is configured to be a rigid circuit board.

In the light-emitting assembly of the steering wheel of the present invention, the light source is provided on the flexible circuit board, and the control assembly for controlling the light source is provided on the rigid printed circuit board, so that the size of the rigid circuit board can be configured to be as small as possible, and the flexible circuit board is used to meet requirements on distribution, mounting, etc., of the light source of the light-emitting assembly, thereby enabling the steering wheel of the present invention to emit light, ensuring that the light-emitting assembly and correspondingly the steering wheel are relatively small and lightweight, and ensuring that the light-emitting assembly does not result in an increase in design difficulty.

The steering wheel 10 according to the embodiment of the present invention is further described below with reference to FIG. 2.

As shown in FIG. 2, the light-emitting assembly 10 according to the embodiment of the present invention further includes a light guide member 300, and the steering wheel rim 20 includes a housing 400.

Figure 8:
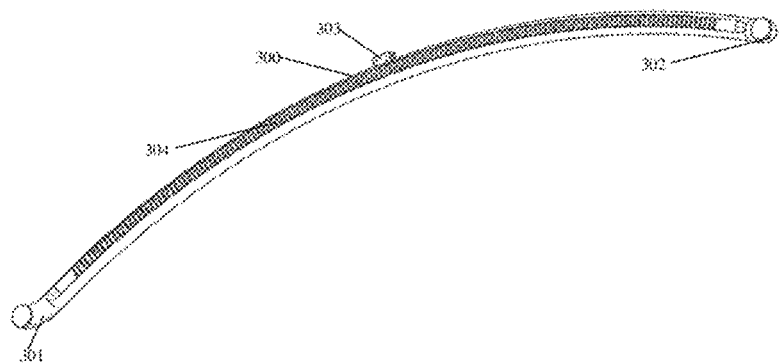
FIG. 8 schematically illustrates some components in a light-emitting assembly in a steering wheel according to an embodiment of the present invention.

As an example, as shown in FIG. 8, the light guide member 300 may be configured to be tubular, and has a first end 301 and a second end 302 that are bent. Further, in order to achieve uniform light emission, a portion of an outer peripheral surface of the light guide member 300 is machined into a flat surface, and the flat surface is provided with a plurality of optical teeth 304. The plurality of optical teeth 304 are arranged in a lengthwise direction of the light guide member 300. As another example, the light guide member 300 may also be a light guide fiber.

Figure 4A:
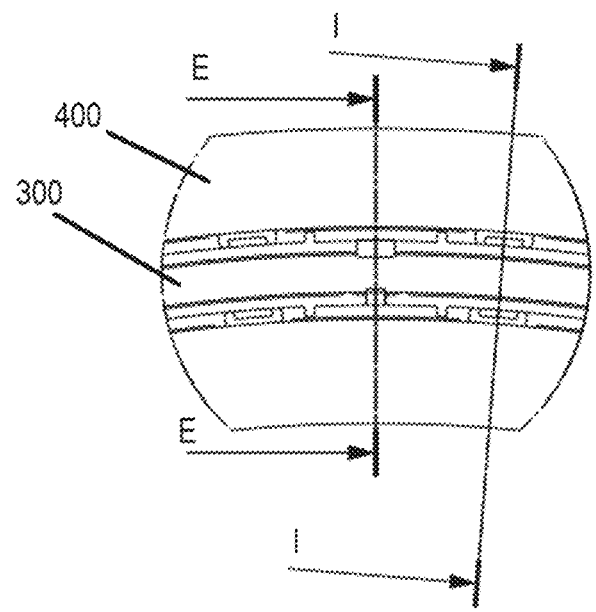
FIG. 4(a) is an enlarged view of a portion A in FIG. 3, and FIG. 4(b) and FIG. 4(c) are cross-sectional views acquired along lines E-E and I-I in FIG. 4(a), respectively.
Figures 4B, 4C:
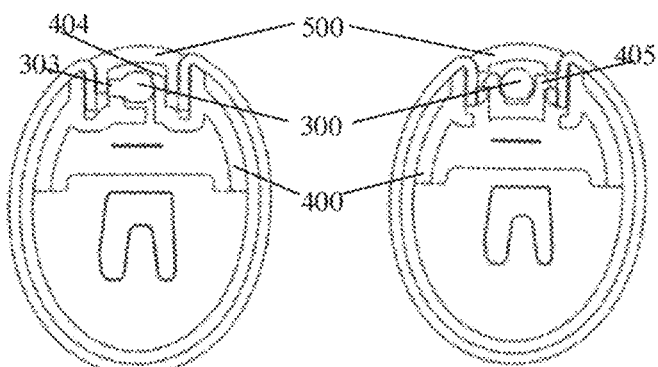

As an example, as shown in FIG. 4(b) or 4(c), the housing 400 is substantially in the shape of a half arc. In addition, two ends of the housing 400 are secured (e.g., bonded) to a foam body 700. The light guide member 300 is provided on a first side surface of the housing 400, and the first printed circuit board 100 and the second printed circuit board 200 are provided on a second side surface of the housing 400 opposite the first side surface. Specifically, in FIG. 2, the first side surface of the housing 400 corresponds to a lower side surface thereof (shown in FIG. 2), and the second side surface of the housing 400 corresponds to an upper side surface thereof (not shown in FIG. 2).

In addition, as shown in FIG. 2, the steering wheel 1 further includes a cap 500, a rigid body 600, the foam body 700, and a sheath 800. The rigid body 600 is provided in the foam body 700 so as to provide rigid support for the entire steering wheel rim 20. As mentioned above, the foam body 700 is used to secure the housing 400, and can also contribute, at least partially, to the formation of the shape of the steering wheel rim. The sheath 800 defines an outer peripheral surface of the steering wheel rim 20 together with the cap 500, and the sheath 800 is secured to the housing 400 (e.g., a portion of the sheath is inserted into a slit provided on the housing 400, as shown in FIG. 4(b) and FIG. 4(c)). In addition, the cap 500 is configured to be a transparent member, and is secured to the housing 400. Light emitted by the light source 110 passes through a hole of the housing 400 (as shown in FIG. 6(a) or FIG. 6(b)) and the light guide member 300, and is then emitted from the cap 500 so as to cause the steering wheel rim to emit light.

In order to accommodate the light guide member 300 and the cap 500, the first side surface of the housing 400 is provided with a recess 400A. This is described in further detail below.

Figure 3:
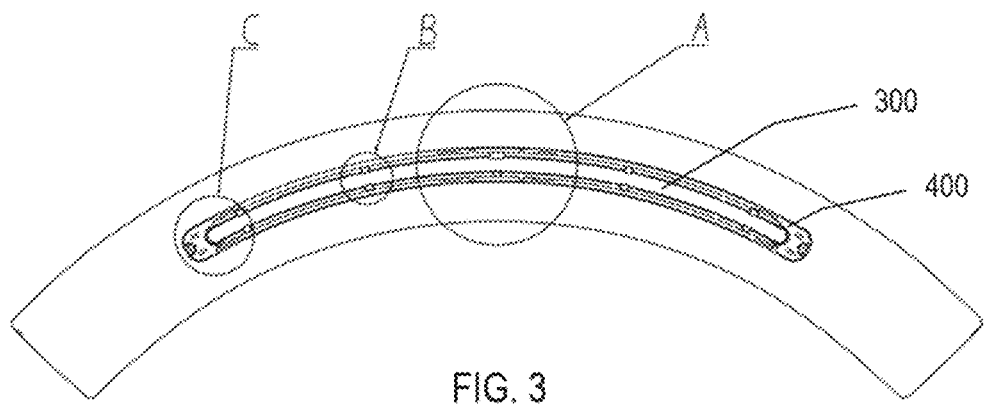
FIG. 3 schematically illustrates a partial view of a light-emitting assembly in a steering wheel according to an embodiment of the present invention.

FIG. 3 schematically illustrates a partial view of a light-emitting assembly in a steering wheel according to an embodiment of the present invention. FIG. 4(a) is an enlarged view of a portion A in FIG. 3, and FIG. 4(b) and FIG. 4(c) are cross-sectional views acquired along lines E-E and I-I in FIG. 4(a), respectively. FIG. 5(a) is an enlarged view of a portion B in FIG. 3, and FIG. 5(b) is a cross-sectional view acquired along a line F-F in FIG. 5(a). FIG. 6(a) is an enlarged view of a portion C in FIG. 3, and FIG. 6(b) and FIG. 6(c) are cross-sectional views acquired along lines H-H and G-G in FIG. 4(a), respectively. The steering wheel according to the embodiment of the present invention is further described below with reference to these accompanying drawings.

As shown in FIG. 3, in order to accommodate the light guide member 300 and the cap 500, the recess 400A provided on the first side surface of the housing 400 is provided with structures for respectively securing the light guide member 300 and the cap 500.

Specifically, with reference to FIG. 4(c), the housing 400 is provided with a fifth protruding portion 405 at the recess 400A. The fifth protruding portion 405 is inserted into a hole of the cap 500, so that the cap 500 is secured to the housing 400. As an example, the fifth protruding portions 405 are arranged in pairs and distributed evenly along the recess 400A.

With reference to FIG. 4(b) and FIG. 5(b), the housing 400 is provided with a fourth protruding portion 404 at the recess 400A, and the fourth protruding portion 404 is configured to abut an upper side of the light guide member 300 so as to hold the light guide member 300 to the housing 400.

With reference to FIG. 6(b) and FIG. 6(c), the housing 400 is provided with a first protruding portion 401, a second protruding portion 402, and a third protruding portion 403 at the recess 400A, and the first protruding portion 401, the second protruding portion 402, and the third protruding portion 403 are provided at each of hook-shaped end portions 301 and 302 of the light guide member 300. As shown in FIG. 6(b), the first protruding portion 401 and the second protruding portion 402 at each hook-shaped end portion are opposite each other in a radial direction of the steering wheel rim 20 and abut the light guide member 300 so as to prevent the light guide member 300 from rotating about an axial direction thereof. In addition, as shown in FIG. 6(c), the third protruding portion 403 abuts an end side of the light guide member 300 so as to prevent the end portion of the light guide member 300 from bending upward relative to the housing 400. Therefore, the first protruding portion 401, the second protruding portion 402, and the third protruding portion 403 advantageously prevent the light guide member 300 from rotating relative to the housing 400. As an example, each of the first protruding portion 401, the second protruding portion 402, and the third protruding portion 403 is configured to be at a distance from the housing 400, and the distance is, for example, 0.1-0.2 millimeters, so that the light guide member 300 is smoothly mounted on the housing 400.

With reference to FIG. 4(b), the light guide member 300 is provided with a position-limiting protruding portion 303 (the position-limiting protruding portion 303 is more clearly shown in FIG. 8). Correspondingly, the recess is provided with a position-limiting recess (not shown), and the position-limiting protruding portion 303 and the position-limiting recess cooperate to limit the position of the light guide member 300 relative to the housing 400 so as to quickly position the light guide member 300 in the housing 300 during mounting. It can be understood that this is merely an example, and the steering wheel of the present invention is not limited thereto. For example, the position-limiting protruding portion may be provided on the housing, and correspondingly the position-limiting recess is provided on the light guide member.

Figures 7A, 7B:
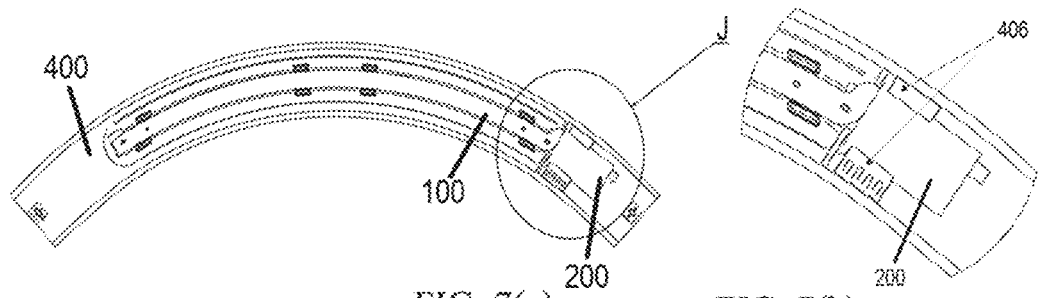
FIG. 7(a) schematically illustrates a partial view of a light-emitting assembly in a steering wheel according to an embodiment of the present invention.
FIG. 7(b) is an enlarged view of a portion J in FIG. 7(a).

FIG. 7(a) schematically illustrates a partial view of a light-emitting assembly in a steering wheel according to an embodiment of the present invention. FIG. 7(b) is an enlarged view of a portion J in FIG. 7(a).

As shown in FIG. 7(b), the housing 400 is provided with a slide slot 406, and the second printed circuit board 200 is configured to slide in the slide slot 406 relative to the housing 400 so as to be secured to the housing 400. Specifically, in the arrangement shown in FIG. 7(b), the second printed circuit board 300 slides from the right to the left in the slide slot 406. The thickness of the slide slot 406 decreases gradually from the right to the left, so that when the second printed circuit board 300 sliding leftwards in the slide slot 406 reaches a position where the thickness of the slide slot 406 is slightly less than the thickness of the second printed circuit board, the second printed circuit board is held tightly in the slide slot 406.

It should be noted that the above embodiments are merely examples, and the steering wheel of the present invention is not limited thereto. For example, the second printed circuit board may also be directly welded to the housing, or secured to the housing by means of securing members such as a screw, etc. In addition, the tubular light guide member may also be prevented from rotating relative to the housing in another manner. An anti-rotation structure for the light guide member may even be omitted when the light guide member is not tubular in shape.

Figures 9A, 9B, 9C:
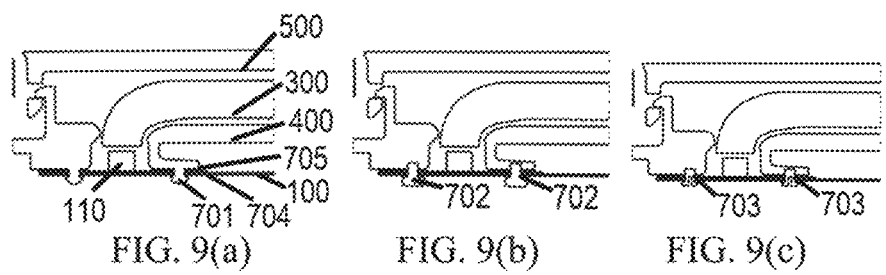
FIG. 9(a), FIG. 9(b), and FIG. 9(c) respectively schematically illustrate partial views of light-emitting assemblies in steering wheels according to different embodiments of the present invention.

FIG. 9(a), FIG. 9(b), and FIG. 9(c) respectively schematically illustrate partial views of light-emitting assemblies in steering wheels according to different embodiments of the present invention. The light-emitting assemblies according to the embodiments of the present invention are further described below with reference to FIG. 9(a), FIG. 9(b), and FIG. 9(c).

As shown in FIG. 9(a), the first printed circuit board 100 is welded to the housing 400. Specifically, the first printed circuit board 100 is secured to the housing 400 by a weld leg 701. An upper side of the first printed circuit board 100 is provided with the light source 110, and another side (i.e., a lower side) opposite the side where the light source 100 is located is provided with a reinforcement portion 704, and at least a portion of the reinforcement portion 704 corresponds to the light source 100 in a thickness direction of the first printed circuit board 100 so as to provide rigid support for the light source 100. In addition, a side surface of the first printed circuit board 100 where the light source 100 is provided is further provided with a glue 705. The glue 705 is represented by a dotted portion in FIG. 7(a). The glue 705 is used to bond the first printed circuit board 100 to the housing 400 so that the first printed circuit board 100 and the housing 400 are more firmly secured to each other. It can be understood that the first printed circuit board 100 is not necessarily secured to the housing 400 by means of welding, and may also be secured to the housing in other manners, for example, by means of a screw (as shown in FIG. 9(b)), a fastener (as shown in FIG. 9(c)), etc.

As described above, although the exemplary embodiments of the present invention have been described with reference to the accompanying drawings in the description, the present invention is not limited to the aforementioned specific embodiments, and the scope of protection of the present invention should be defined by the claims and equivalent meanings thereof.

The invention claimed is:

1. A steering wheel comprising a steering wheel rim and a light-emitting assembly, the steering wheel rim having an inner cavity, and the light-emitting assembly being provided in the inner cavity so as to be used to cause the steering wheel rim to emit light, wherein the light-emitting assembly comprises a light source, a first printed circuit board, and a second printed circuit board, wherein the light source is provided on the first printed circuit board, the second printed circuit board being provided with a control assembly for controlling the light source, the second printed circuit board being configured to control the light source by means of an electrical connection with the first printed circuit board; the first printed circuit board being configured to be a flexible circuit board, and the second printed circuit board being configured to be a rigid circuit board; wherein the light guide member is configured to be a light guide tube, and the protruding portion comprises a first protruding portion, a second protruding portion; a third protruding portion, and a fourth protruding portion; the first protruding portion, the second protruding portion, and the third protruding portion being provided at each hook-shaped end portion of the light guide member, the first protruding portion and the second protruding portion at each hook-shaped end portion being opposite each other in a radial direction of the steering wheel rim and abutting the light guide member, the third protruding portion abutting an end side of the light guide member so as to prevent the light guide member from rotating relative to the housing; and the fourth protruding portion being configured to abut an upper side of the light guide member so as to hold the light guide member to the housing.

2. The steering wheel according to claim 1, wherein the light-emitting assembly further comprises a light guide member, the steering wheel rim comprising a housing with a recess, the light guide member being provided on a first side surface of the recess, and the first printed circuit board and the second printed circuit board being provided on a second side surface of the recess opposite the first side surface.

3. The steering wheel according to claim 1, wherein one of the light guide member and the recess is provided with a position-limiting protruding portion, and the other is provided with a position-limiting recess, the position-limiting protruding portion and the position-limiting recess cooperating to limit the position of the light guide member relative to the housing.

4. The steering wheel according to claim 1, wherein another side of the first printed circuit board opposite a side where the light source is located is provided with a reinforcement portion, and at least a portion of the reinforcement portion corresponds to the light source in a thickness direction of the first printed circuit board.

5. The steering wheel according to claim 1, wherein the housing is provided with a slide slot, and the second printed circuit board is configured to slide in the slide slot relative to the housing so as to be secured to the housing.

6. The steering wheel according to claim 2, wherein the housing is provided with a recess for accommodating the light guide member, and the recess is provided with a protruding portion for securing the light guide member.

7. The steering wheel according to claim 2, wherein the steering wheel rim further comprises a cap secured on the housing, and light emitted by the light source passes through a hole of the housing and the light guide member, and is then emitted from the cap so as to cause the steering wheel rim to emit light.

8. The steering wheel according to claim 4, wherein the first printed circuit board is secured to the housing by means of a securing member and at the reinforcement portion.

9. The steering wheel according to claim 5, wherein one end of the first printed circuit board is inserted into an interface provided on the second printed circuit board so as to achieve the electrical connection between the first printed circuit board and the second printed circuit board.

* * * * *